J. WILKINSON.
Cooling Dairies.
No. 150,644.
Patented May 5, 1874.
2 Sheets--Sheet 2.
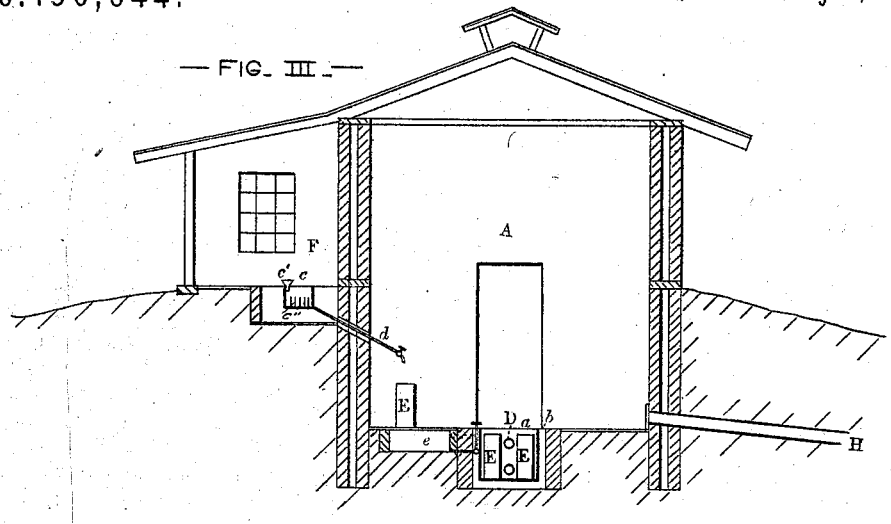
FIG. III.
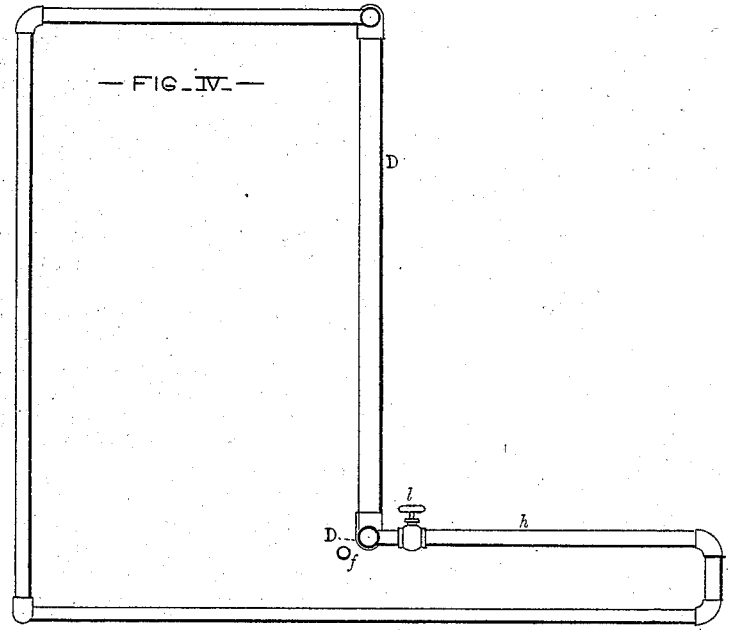
FIG. IV.
WITNESSES:
Thos Corner Jr
Woodruff W Wharton
INVENTOR:
John Wilkinson
by Gitt & W.T. Howard
attys

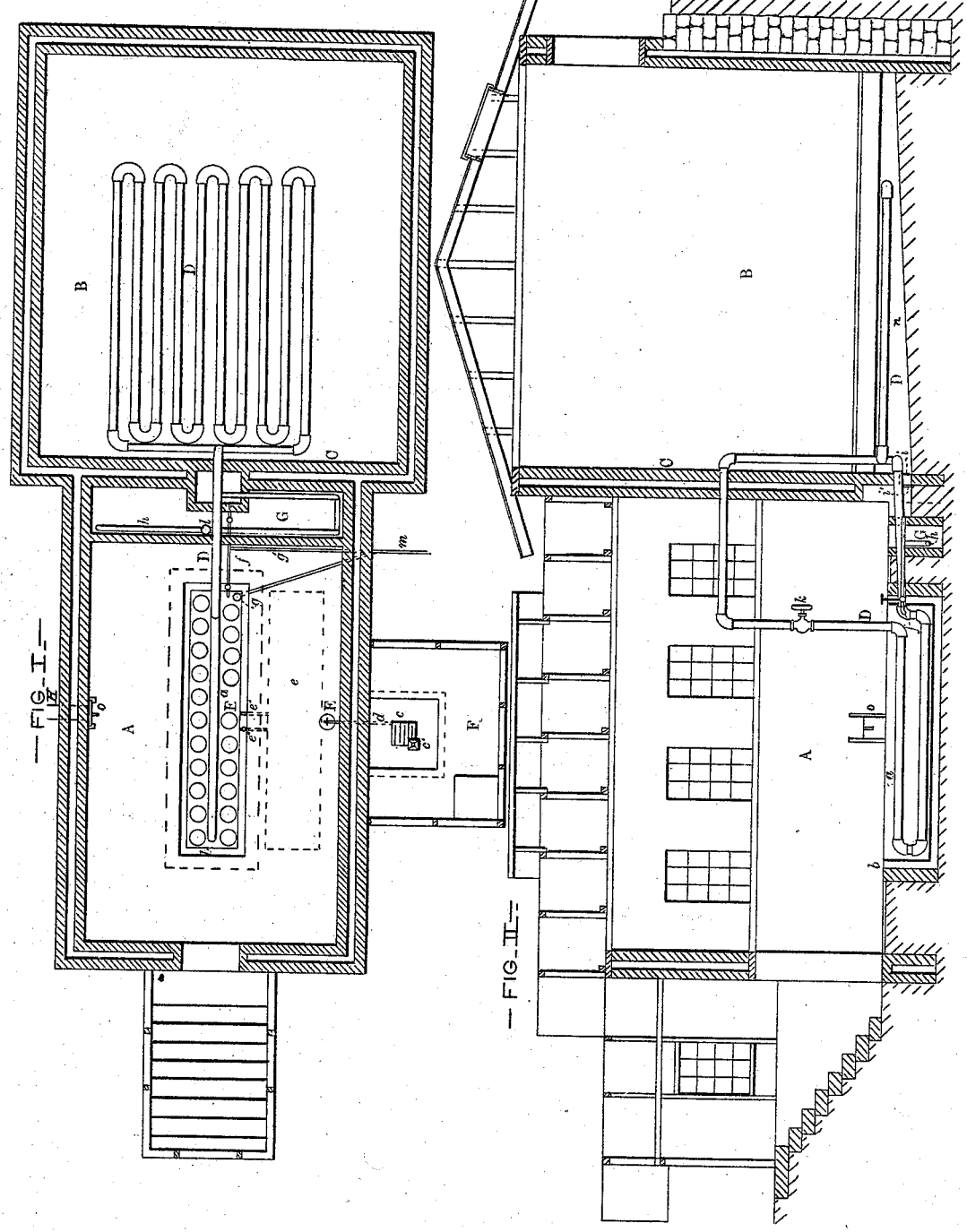
J. WILKINSON.
Cooling Dairies.
No. 150,644.
2 Sheets--Sheet 1.
Patented May 5, 1874.

UNITED STATES PATENT OFFICE.

JOHN WILKINSON, OF BALTIMORE, MARYLAND.

IMPROVEMENT IN COOLING DAIRIES.

Specification forming part of Letters Patent No. 150,644, dated May 5, 1874; application filed January 13, 1874.

*To all whom it may concern:*

Be it known that I, JOHN WILKINSON, of the city of Baltimore and State of Maryland, have invented certain Improvements in Dairies, of which the following is a specification; and I do hereby declare that the same is a full, clear, and exact description of my said invention, reference being had to the accompanying drawing and to the letters of reference marked thereon.

My invention relates to a dairy placed contiguously to an ice-house, and arranged in such manner that the milk and cream contained in the dairy shall be cooled by a current of water circulating automatically through an endless pipe from the ice-house to the dairy, and which current, after having absorbed a portion of the heat from the milk, is returned to the ice-house by being displaced by water of a lower temperature and greater density.

In the further description of my invention which follows, due reference must be had to the accompanying drawing, in which—

Figure 1 is a ground plan; Fig. 2, a longitudinal section; Fig. 3, a transverse section, and Fig. 4 a detached and enlarged view of a system of pipes hereinafter described.

Similar letters of reference indicate similar parts in all the views.

A represents the dairy-room, and B the ice-house, which are separated by the partition-wall C. To prevent absorption and radiation of heat the walls of the structures are double and form an air-space, which air-space is, by the introduction of horizontal or oblique diaphragms, divided into separate and distinct chambers or stories. The object of this isolation of the chambers or stories is to prevent the circulation of the air contained therein by reason of solar influence on a portion of the walls. D is an endless pipe, a portion of which occupies the ice-house, where it is formed into a gang, over which a floor is laid to support the ice. One portion of the pipe leads through the partition-wall C to a vat or water-bath, $a$, placed within a tank in the floor and supported upon legs. The water-bath $a$ is surrounded by the air-space $b$ for the purpose of preventing absorption of heat. The pipe D enters the water-bath at one end, near the bottom, and extends nearly to the other end, when it returns and rises vertically before passing again through the partition into the ice-house. It will be understood that, as the temperature of the ice-house is much below that of the dairy and water-bath, an active circulation of the water in the pipe D must take place, impelled by the sinking of the coldest portion to the lowest point and the displacement of the warmer. E E are milk-cans, which, when filled, are placed in the water-bath to be cooled. As it is important that the milk should be deprived of its animal heat rapidly, I construct an apartment, F, having a vat, $c$, with a pipe, $d$, leading therefrom to the dairy for the purpose of filling the cans from without the dairy. The vat $c$ is provided with a funnel, $c'$, through which the milk is poured. The bottom of the vat is formed with a series of vertical strips, $c''$, the said strips making a circuitous channel, in passing through which the milk is exposed to the air and a larger quantity cooled before entering the cans, which are filled separately from the end of the pipe $d$. To assist in the cooling of the milk in this vat during hot weather, I construct the vat in such manner that ice or ice and salt can be applied to the outside. It is necessary to the proper cooling of the milk that the water in the water-bath should be kept at a uniform depth, and, as the number of the milk-cans placed in the bath varies, I provide a reservoir, $e$, under the pavement by the side of the bath to receive any water displaced by the milk-cans, and from which to draw a supply when wanted. The reservoir is connected to the water-bath by the pipes $e'$ $e''$, the latter being the lower, and provided, as the supply-pipe, with a cock. The bottom of the reservoir is level with the surface of the water in the water-bath when not occupied with milk-cans. G is a tank to be used for storing butter and cream; or it may be used as an additional water-bath for milk, if necessary. This tank is partially cooled under ordinary circumstances by the pipe D passing through it; but the temperature can be further lowered by opening the cock $l$, which allows a circulation of water through the gang-pipe $h$. The ground-floor of the ice-house is inclined toward the dairy, allowing the water produced by the melting of the ice to flow through the aperture $i$ into a portion of the above-named tank, which is partitioned off and of a depth less than that of the other portion, and thence, through the pipe $f$, to the main water-bath. The aperture $i$, at the end leading into the partitioned-off part of the tank G, is covered by the strainer $i'$. In the pipe $f$ is a cock placed in the air-space $b$, which cock, when closed, causes the waste water to rise and pass into an overflow-pipe, $g'$, with which pipe the upright overflow-pipe $g$ connects. In emptying the bath the upright pipe $g$, which fits, by a ground joint, into the bottom of the bath, is raised; but ordinarily the depth of the water in the bath is regulated by a flow over the top of this pipe. The water, having passed over the top of the pipe $g$, is carried thence away from the dairy through the waste-pipe $m$.

The temperature of the water-bath and milk can be regulated by the cock $k$, which controls the velocity of the current in the pipe D. When the cock is entirely closed the circulation of water ceases, and the draft on the ice is discontinued.

Connected with the center of the dairy, I construct a subterranean air-duct, H, leading at a downward incline, some seventy or eighty feet, to a point at which the air is admitted, the purpose of which duct is to warm and ventilate the dairy during the winter months. These effects are produced by reason of the duct being placed in the earth below frost, at a depth at which the temperature of the earth is uniform; and the air which enters the duct, absorbing heat from the earth, becomes rarefied, rising through the dairy and escaping at its ceiling. The end of the duct leading into the dairy is provided with a valve, $o$, by means of which the passage of the rarefied air into the dairy is controlled.

The ice-house is provided with suitable doors, situated in positions best adapted to the introduction and removal of ice, and the dairy with windows for lighting and ventilating purposes. The entrance to the dairy is protected by a vestibule having double doors.

Having thus described my invention, what I claim as new, and desire to secure by Letters Patent of the United States, is—

1. A dairy placed contiguously to an ice-house, cooled by an active circulation of water through an endless pipe, the current being created by the displacement of the warmer water in the pipe by water constantly cooling in the ice-house, substantially as herein set forth.

2. The return-pipe D, leading from the ice-house to the dairy and water-bath $a$, surrounded by the space $b$, in the relative relation specified.

3. The water-bath $a$ in its vat $b$, and provided with the pipe $g$, constructed, with relation to the reservoir $e$ and pipes $c'$ $c''$, as specified.

4. The partitioned tank G, having an aperture, $i$, leading to the upward-inclining ground-floor of the ice-house, strainer $i'$, pipes $f$, D, and $h$, in relative relation, as specified.

5. The downward-inclining air-duct H, having its inner end provided with a valve, $o$, in combination with the dairy, substantially as set forth.

JOHN WILKINSON.

Witnesses:
    JAS. HENDERSON,
    W. S. WILKINSON.